Sept. 2, 1930.  A. O. LOMBARD  1,774,835
TRACTION DEVICE
Filed April 4, 1929  2 Sheets-Sheet 1
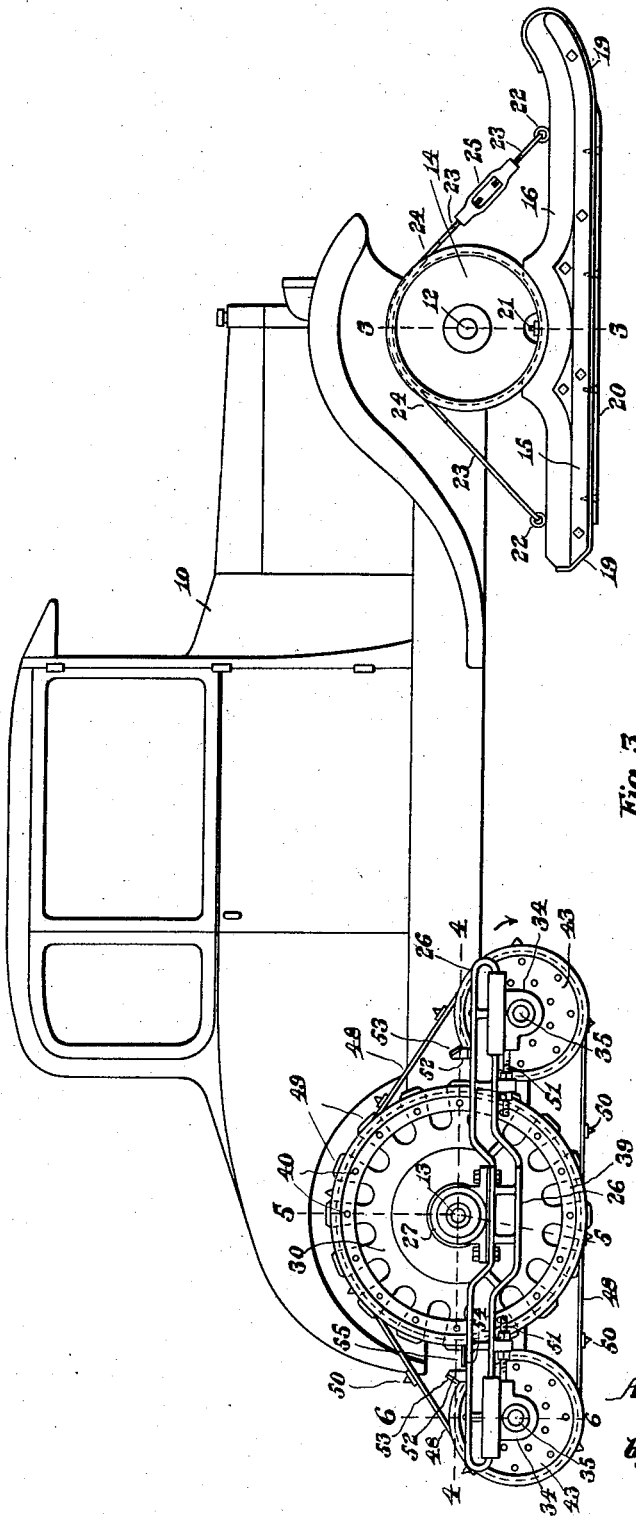
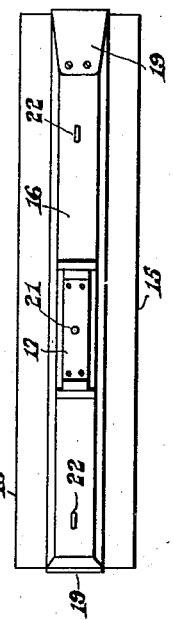
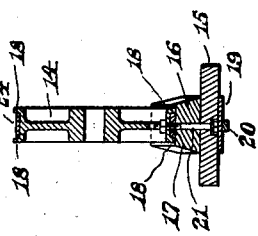
Inventor:
Alvin O. Lombard,
by Walter E. Lombard.
Atty.

Sept. 2, 1930.  A. O. LOMBARD  1,774,835
TRACTION DEVICE
Filed April 4, 1929  2 Sheets-Sheet 2
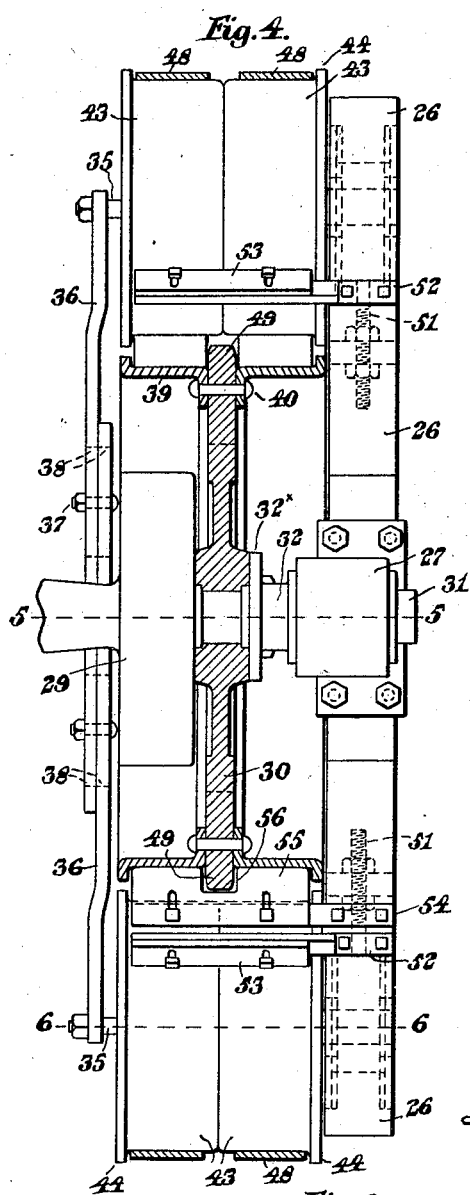
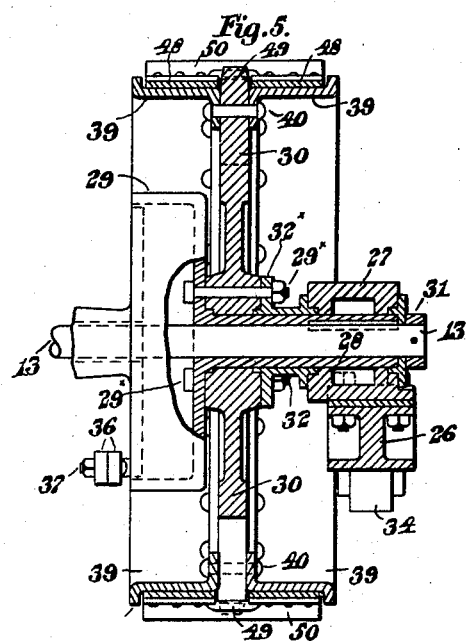
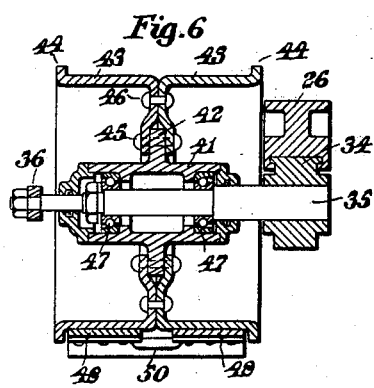
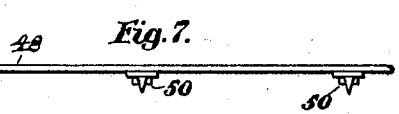
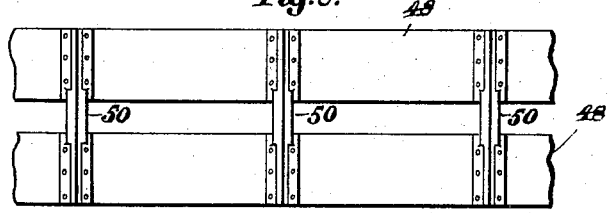
Inventor:
Alvin O. Lombard,
by Walter E. Lombard,
Atty.

Patented Sept. 2, 1930

1,774,835

UNITED STATES PATENT OFFICE

ALVIN O. LOMBARD, OF WATERVILLE, MAINE

TRACTION DEVICE

Application filed April 4, 1929. Serial No. 352,387.

This invention relates to traction devices and has for its object the provision of means whereby an ordinary motor car may be provided with runners and tractor mechanism so that the car may be used in winter when the ground is covered with snow.

This object is attained by the mechanism illustrated in the accompanying drawings.

For the purpose of illustrating the invention, one preferred form thereof is illustrated in the drawings, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawings:

Figure 1 represents an elevation of motor car having applied thereto driving mechanism and runners embodying the principles of the present invention.

Figure 2 represents a plan of one of the forward runners removed from the car.

Figure 3 represents a vertical section of same on line 3, 3, on Fig. 1.

Figure 4 represents a horizontal section of the tractor mechanism on line 4, 4, on Fig. 1.

Figure 5 represents a central vertical section of same on line 5, 5, on Figs. 1 and 4.

Figure 6 represents a vertical section of same on line 6, 6, on Figs. 1 and 4.

Figure 7 represents an elevation of a portion of the endless belt of the tractor mechanism, and Figure 8 represents an inverted plan of same.

Similar characters indicate like parts throughout the several figures of the drawings.

In the drawings, 10 is a motor car provided with a front axle 12 and rear axles 13.

Secured to each end of the front axle is a wheel 14.

When it is desired to convert the motor car into a snowmobile, the tire is removed from each wheel 14 and a runner 15 secured thereto.

This runner consists of a broad plank having superimposed thereon a cradle 16 provided with a metal top plate 17 which fits between the flanges 18 of the rim of the wheel 14.

Beneath the runner 15 is a metal bottom plate 19 having secured thereto a narrow strip 20 midway thereof and extending lengthwise of said plate.

A bolt 21 extends through the runner 15, cradle 16 and top plate 17, locking the same to the wheel 14.

Any lateral movement of the cradle relatively to said wheel 14 is prevented by the flanges 18 on the rim of the wheel.

At the opposite ends of the cradle 16 are eye-bolts 22 to which is secured a strap 23 which is flattened at 24, this flattened portion extending over the top of the wheel 14 and being positioned between the flanges 18 thereof.

Interposed between the ends of this strap 23 is a turnbuckle 25 which may be actuated to draw the top plate 17 of the cradle 16 into firm contact with the periphery of the wheel.

Depending from the outer end of each rear axle 13 is a girder 26 having secured midway of its length a housing 27 in which is disposed a hub 28, this hub forming a part of the usual brake drum 29.

The hub 28 is keyed to the axle 13 as indicated in Fig. 5.

A collar 31 is pinned to the extreme outer end of each axle 13 to prevent the displacement of the girder 26 from the axle 13.

Between the girder 26 and the sprocket wheel 30 is a separating ring 32 having a flange 32×.

Bolts 29× extend through the wall of the brake drum 29, the sprocket wheel 30 and the flange 32× to lock these members together.

By means of this mechanism the rotation of each axle 13 will be imparted to the sprocket wheel 30 surrounding said wheel.

The opposite end of each girder has slidably mounted in the under face thereof blocks 34 to each of which is rigidly secured one end of a cylindrical support 35 extending laterally therefrom, The opposite ends of each pair of cylindrical supports 35 are connected by separating bars 36 which may be adjusted relatively to each other to retain each pair of cylindrical supports in parallelism.

When these bars have been properly adjusted they are locked together by means of the bolts 37 extending through slots 38 in said bars 36.

To the opposite faces of each sprocket wheel 30 are secured flanged cylindrical members 39 by bolts 40.

Revolubly mounted upon each cylindrical support 35 is a hub 41 having a central flange 42 to the opposite faces of which are secured cup-shaped members 43 having flanges 44 at the outer ends thereof.

These cup-shaped members are secured to the flange 42 by means of the bolts 45 and secured together by other bolts 46 and when thus secured together form flanged drums.

Within the hub 41 are located anti-friction members 47 of usual construction which permit the drum formed by the cup-shaped members 43 to freely rotate on the cylindrical supports 35.

Mounted upon the cylindrical flanged members 39 and the drums 43 are two endless belts 48 which are made of tough fabric and are separated sufficiently to permit the teeth 49 of the sprocket wheel 30 to extend beyond the outer face of said belts.

At proper distances apart the two belts 48 have secured thereto metal connecting members 50, these members being adapted to coact with the teeth 49 so that when the sprocket wheel is rotated the endless belts will be actuated.

These cross members 50 not only provide a means for actuating the endless belts 48 but also have V-shaped projections on the outer faces thereof forming shoulders adapted to grip upon the snow surface and cause a forward movement of the car when the axles 13 are rotated.

In order to keep the belts 48 taut at all times the blocks 34 may be moved towards the ends of the girder 26 by means of the adjusting screws 51.

Secured to each girder 26 and extending over each drum 43 is a bar 52 having adjustably mounted thereon a scraper 53 which is adapted to remove the snow from the periphery of the drums 43 when the car is being used.

Another bar 54 is secured to each girder 26 and extends across the periphery of the flanged cylindrical members 39 and has adjustably mounted thereon a scraper plate 55 which removes the snow from the periphery of these members 39 when the car is in use.

This scraper member 55 has an opening 56 therein which permits the passage of the teeth 49 of the sprocket wheel 30.

The runners at the forward end of the car may be quickly applied to the front wheels after the shoes have been removed therefrom.

Likewise the tractor mechanism may be quickly applied to the rear axles 13 of the motor car after the usual wheels have been removed therefrom.

This tractor mechanism is constructed of light weight material and of sufficient breadth so that it will never sink deeply into the snow over which the car is passing.

The spaces between the teeth 49 extend well in toward the axles 13 and provide a ready passage of any snow collected on the sprocket wheel or carried upwardly by the endless belt 48.

It is believed that the operation and many advantages of the invention will be understood without further description.

Having thus described my invention, I claim—

1. The combination of a motor car; girders depending from and adapted to swing on the rear axles of said car; adjustable blocks at the opposite ends of each girder; cylindrical supports extending laterally from said blocks; drums revoluble on said supports; a sprocket wheel revoluble with each axle; cylindrical flanged members secured to the opposite sides of each sprocket wheel the flanges of which extend outwardly a distance less than the teeth of said sprocket wheel; parallel endless belts passing over the peripheries of said drums and cylindrical flanged members; and connecting members secured to the outer faces of said belts coacting with the teeth of said sprocket wheel.

2. The combination of a motor car; girders depending from and adapted to swing on the rear axles of said car; cylindrical supports extending laterally from the opposite ends of each girder; drums revoluble on said supports; a sprocket wheel revoluble with each axle; cylindrical flanged members secured to the opposite sides of each sprocket wheel and having a diameter less than that of said sprocket wheel; parallel endless belts passing over the peripheries of said drums and cylindrical flanged members; and means secured to the outer faces of and projecting outwardly from said endless belts coacting with the teeth of said sprocket wheel to actuate said endless belts.

3. The combination of a motor car; girders depending from and adapted to swing on the rear axles of said car; adjustable blocks at the opposite ends of each girder; a cylindrical support rigidly secured at one end to each of said blocks; drums revoluble on said supports; a sprocket wheel revoluble with each axle; cylindrical flanged members secured to the opposite sides of each sprocket wheel; parallel endless belts passing over the peripheries of said drums and cylindrical flanged members; means coacting with the teeth of said sprocket wheels for actuating said belts; and adjustable separating bars connected to the opposite ends of said supports to retain them in parallelism.

4. The combination of a motor car; girders depending from and adapted to swing on the rear axles of said car; adjustable blocks at the opposite ends of each girder; cylindrical supports extending laterally from said blocks; drums revoluble on said supports; a sprocket wheel revoluble with each axle; cylindrical flanged members secured to the opposite sides of each sprocket wheel; parallel endless belts of tough fabric passing over the peripheries of said drums and cylindrical flanged members; and metal connecting members secured to said belts coacting with the teeth of said sprocket wheels and having V-shaped members projecting outwardly therefrom.

5. The combination of a motor car; girders depending from and adapted to swing on the rear axles of said car; adjustable blocks at the opposite ends of each girder; cylindrical supports extending laterally from said blocks; a revoluble member on each support having an annular flange; drums revoluble on said supports formed of two cup-shaped members secured to said flange; a sprocket wheel revoluble with each axle; cylindrical flanged members secured to the opposite sides of each sprocket wheel; parallel endless belts passing over the peripheries of said drums and cylindrical flanged members; and means on the belts coacting with the teeth of said sprocket wheels for actuating said belts.

6. The combination of a motor car; girders depending from and adapted to swing on the rear axles of said car; adjustable blocks at the opposite ends of each girder; cylindrical supports rigidly secured to said blocks and extending laterally therefrom; flanged drums freely revoluble on said supports; a sprocket wheel revoluble with each axle and having the spaces between the teeth thereof extending inwardly well toward the center thereof; cylindrical flanged members secured to the opposite sides of each sprocket wheel with their inner edges well outside the inner ends of said spaces; parallel endless belts passing over the peripheries of said drums and cylindrical flanged members between the flanges thereof; means secured to the outer faces of said belts and coacting with the teeth of said sprocket wheels to actuate said belts; and means supported by said girders for removing snow from the surfaces of said drums and cylindrical flanged members.

7. The combination of a motor car; girders depending from and adapted to swing on the rear axles of said car; cylindrical supports extending laterally from the opposite ends of each girder; drums revoluble on said supports; sprocket wheels having the spaces between their teeth extending inwardly well toward the center thereof; cylindrical flanged members secured to the opposite sides of each sprocket wheel and having an outer diameter less than that of said sprocket wheel and their inner edges well outside the inner ends of said spaces; endless belts passing over the peripheries of said drums and cylindrical flanged members; and means secured to the outer faces of said belts coacting with the teeth of said sprocket wheels to actuate said belts.

Signed by me at Waterville, Maine, this 30th day of March, 1929.

ALVIN O. LOMBARD.